US011434074B2

(12) United States Patent
Raggi et al.

(10) Patent No.: US 11,434,074 B2
(45) Date of Patent: Sep. 6, 2022

(54) APPARATUS AND METHOD FOR SELECTIVELY WITHDRAWING PANELS WITH DIFFERENT FINISHES

(71) Applicant: CEFLA Societá Cooperativa, Imola (IT)

(72) Inventors: Gianni Raggi, Imola (IT); Massimo Dovadola, Imola (IT)

(*) Notice: Subject to any disclaimer, the term of this patent is extended or adjusted under 35 U.S.C. 154(b) by 95 days.

(21) Appl. No.: 16/949,161

(22) Filed: Oct. 15, 2020

(65) Prior Publication Data
US 2021/0114807 A1 Apr. 22, 2021

(30) Foreign Application Priority Data

Oct. 18, 2019 (IT) .................. 102019000019250

(51) Int. Cl.
B65G 1/04 (2006.01)
F26B 25/00 (2006.01)
(52) U.S. Cl.
CPC .......... B65G 1/0421 (2013.01); F26B 25/004 (2013.01)
(58) Field of Classification Search
CPC ..... B65G 1/0435; B65G 1/0421; F26B 25/14; F26B 25/004; F26B 9/06
See application file for complete search history.

(56) References Cited

U.S. PATENT DOCUMENTS

2021/0284466 A1* 9/2021 Raggi .................... B65G 47/71

FOREIGN PATENT DOCUMENTS

| CN | 106044034 A | * | 10/2016 | .......... B65G 1/0421 |
|---|---|---|---|---|
| CN | 107436078 | | 12/2017 | |
| CN | 208165848 | | 11/2018 | |
| CN | 110044162 | | 7/2019 | |
| CN | 110683268 A | * | 1/2020 | |
| EP | 3742096 A1 | * | 11/2020 | |
| JP | S54120090 | | 8/1979 | |
| JP | 2016080265 | | 5/2016 | |
| WO | 2019107610 | | 6/2019 | |

OTHER PUBLICATIONS

Italian Patent and Trademark Office, Written Opinion —Relevant portions are in English.

* cited by examiner

Primary Examiner — Kaitlin S Joerger
(74) Attorney, Agent, or Firm — Themis Law

(57) ABSTRACT

A vertical oven for drying and temporarily storing painted panels includes racks for supporting the panels; an uploading/downloading system into/from the vertical oven; and a stacker crane having two multiple forks each including a plurality of single forks, a first multiple fork withdrawing the panels from a first side of the oven and a second multiple fork withdrawing the panels from the opposed side of the oven, the panels being positioned on the racks side by side or alone based on width. A control unit controls panel uploading/downloading and/or the stacker crane through a control software. Each single fork has an independent actuator and is separately controlled by the control unit. The software configures the control unit to determine the number of single forks to be actuated according to the length of the panel to be withdrawn, and the length of the stroke of the forks based on panel width.

11 Claims, 8 Drawing Sheets

APPARATUS AND METHOD FOR SELECTIVELY WITHDRAWING PANELS WITH DIFFERENT FINISHES

FIELD OF THE INVENTION

The present invention relates to an apparatus and a method for the selective withdrawing of mainly flat panels from a storage/warehouse oven suitable for the complete drying of painted panels for preparing an order to be shipped to customer.

In this context, an order means a list comprising a plurality of panels well-defined in terms of kind of finish (e.g. glossy/matt), color, dimensions of every single panel. E.g., an order may comprise a glossy red panel having main dimensions of 400×600 mm, a matt blue panel having dimensions of 500×1200 mm, etc.

A mainly flat panel means a panel wherein two of its three dimensions are much wider than its third dimension. Typically, the dimensions of such panels range 100×300×18 mm to 1250×2400×30 mm.

The system according to the present invention allows to combine in production batches the panels to be painted according to their color and/or kind of paint (e.g. glossy/matt) to be applied. This in order to reduce the need of color changing of painting machines, and to perform the subsequent panel withdrawing downstream the drying systems, in a mode which is independent from panel loading.

Panels are normally grouped by "painting batch"; such group can comprise panels that are intended for different customer orders. The novel device allows to withdraw just the panel/s belonging to a single customer order in a random mode, both when the order comprises just one panel, and when the order comprises a plurality of panels, stored in another place of the storage system.

BACKGROUND OF THE INVENTION

In the art, preparing orders comprising panels provided with different dimensions/finish is known. The preparation of the order is performed through a generally manual withdrawing of the panels, from a stack of panels placed in a finished products warehouse placed downstream the painting machines.

This productive system is based on batch-and-queue production, and generates long lead times; moreover, it requires to produce panels in advance with respect to shipping.

Even with the more accurate forecast, the emergency production of panels that are not in the finished goods warehouse is inevitably necessary, or alternatively obsolescence is generated when such warehouse inventories are dimensioned so as to have a greater safety margin.

All this is antithetic with the most modern techniques for organizing production, based on methods known as Toyota Production System (TPS) or Lean Production or Just in Time (JIT).

Market drivers are: delivery speed and product customization, lead time reduction, reduced dimensions of production batches, developing and producing special pieces. The production for a more modern warehouse as performed up to now is possible just for non-customized product (mass production).

The market requirement is to produce lots size one, with a huge range of finish and dimensions of the panels, and with pull manufacturing.

For mechanical processing the problem was tackled, and now there are provided sundry solutions on the market. For painting, the problem is more complex.

The set-up time of the painting machines, although was reduced to few minutes, inevitably is very expensive due to material waste and need of cleaning solvents (in addition to the purchase cost, there is also the disposal cost to be considered).

Therefore, to reduce these costs, the production is scheduled according to daily shipping, grouping the panels to be produced as much as possible according to the kind of paint applied.

Despite these methods, the number of paint changes in a working shift went from about a hundred to several tens.

In order to ensure the long drying times (indicatively 6 hours) required for the finish most appreciated by the market, painting plants work with discontinuous systems (batches comprising 8-12 pieces on average).

The discontinuity can concern the coating step, which can occur through machines provided with continuous or discontinuous feeding, but it is conditioned by the vertical ovens or storages, which to ensure long drying times work with trays or racks operating according to FIFO (First In First Out) logic.

The need of ensuring long drying times does not allow to store just one piece on a rack, therefore the logic of grouping all the panels having the same finish in one or more racks allows also to optimize the drying times, in addition to reducing the number of product changes.

One document concerning the withdrawing of objects is e.g. US20180025410A1 of DEMATIC CORP, which discloses an order fulfilment system and method for preparing orders in a warehouse and a plurality of customer orders in a data base, wherein the inventory items make up the customer orders. Some of the orders being a single item order having only one inventory item assigned to that order, and other of the orders being multiple item orders having multiple inventory items assigned to that order. Inventory items withdrawn from the warehouse are identified with an identifier and the identity of each withdrawn inventory item applied to the data base and matched item with a customer order. Inventory items are combined together that make up an order with a sortation system. The sortation system has an induct subsystem and the induction subsystem has an input. Inventory items are transported from the warehouse to the induction subsystem input with a transportation system. Inventory items assigned to multiple-item orders are forwarded to the sortation system with the induct subsystem responsive to the data base. Inventory items assigned to single item orders are forwarded to a packing station bypassing the sortation system responsive to the data base.

Another document of the known art is IT1309018 of the same applicant, describing a vertical oven provided with tray stacks, which support the pieces to be dried. Such trays can follow two different paths inside the oven: a first path for a short drying cycle and a second path for a long drying cycle, having a meandering path. For uploading and downloading pieces, inlet and outlet roller conveyors are provided.

SUMMARY OF THE INVENTION

Aim of the present invention is providing an apparatus and a method for the selective withdrawing of panels provided with different finish from an oven that supports them, according to a random sequence and a pull logic.

This object is achieved by an apparatus and a method having the features of the independent claims. Advantageous embodiments and refinements are specified in claims dependent thereon.

The drying of painted panels can occur in the same vertical oven according to the present invention, or a first partial drying can take place in a traditional FIFO oven (like the one described in IT1309018), while the completion of the drying and the storage occur in the flexible oven provided with the stacker crane which is the object of the present invention.

An embodiment of the apparatus according to the present invention comprises:

A vertical oven for the drying or the completion of the drying of painted panels, comprising panel inlet-outlet roll conveyors, and fixed racks comprising cantilevered laths for supporting said painted panels on a plurality of levels;

a pair of multiple forks positioned so as to face each other (which in the resting position intersect) and with an independent system for the lateral translation towards opposed sides, in order to insert and withdraw said panels from said racks; said multiple forks being installed in a stacker crane;

a. wherein each single fork composing said multiple forks is actuated individually and independently for the step of raising and withdrawing the panel;

b. wherein in the withdrawing step the raising of single forks can be actuated so as to withdraw just one row of panels (or just one panel) in a partial way;

c. should the panel to be withdrawn placed in a distal row, there is provided the shifting of all the panels placed on a rack, so inverting the entry side of the racks, and therefore withdrawing the panel from the proximal row and not from the row initially near to the stacker crane.

The method according to the present invention comprises the following steps:

a. Uploading said painted panels inside said oven, withdrawing them from the inlet roll conveyor through the multiple forks of the stacker crane and inserting them in any free rack of said oven;

b. Keeping said painted panels inside said oven for a time sufficient for their drying or the completion of their drying;

c. Withdrawing said painted panels through the multiple forks of the stacker crane and depositing on the outlet conveyor roller for preparing a customer order;

there being provided a software suitable for:

saving the position of the painted panels uploaded in the oven, in terms of location (position) of the rack and position of said panel inside said rack, as well as the dimensions and the finish of each single panel;

actuating the single forks of the multiple fork system according to the length and width of the panel/s to be withdrawn.

A first advantage of the present invention lies in the possibility of preparing the customer order in a fully automated way, without the need of intervention of a human operator.

A second advantage of the present invention is the possibility of moving even a single painted panel during the preparation of the order.

A third advantage is the possibility of the optimization of product (colour) changes during painting, according to production batch.

BRIEF DESCRIPTION OF THE DRAWINGS

Further advantages and properties of the present invention are disclosed in the following description, in which exemplary embodiments of the present invention are explained in detail on the basis of the drawings

Note to the Figures: in some cases, the same situation is shown in two different views indicated by the same numeral, e.g. top and side view, or side and axonometric view, in order to facilitate the understanding of the description, as some portions of the drawings are better observable in one or the other view.

DETAILED DESCRIPTION OF EMBODIMENTS OF THE INVENTION

Figure 1:
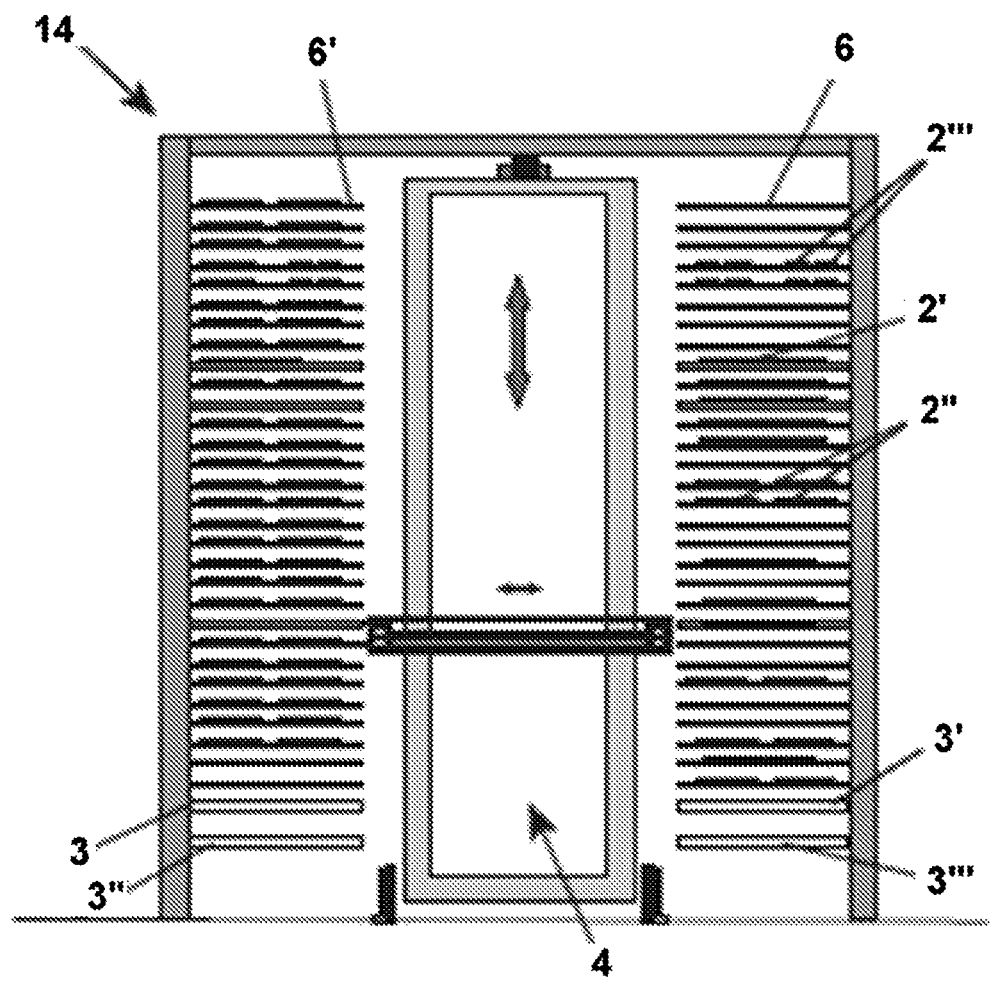
FIG. 1 shows a vertical oven, in front view.

FIG. 1 shows a typical vertical oven 1 for drying painted panels, generically indicated with 2.

Indicatively, the dwell time for the complete drying of the painted panels 2 inside said oven 1 can range few minutes to 24 hours. Previously to their insertion into the vertical oven 1, said panels 2 can undergo a preventive partial drying in a (not shown) dedicated oven, after their painting.

The oven 1 is provided with at least a roller conveyor 3, preferably two roller conveyors 3, 3' for the inlet and outlet of painted panels 2 from said oven 1. In a preferred embodiment, the oven 1 is provided with a plurality of roller conveyors 3, 3' which convey said panels 3 inside or outside said oven, while the roller conveyors 3", 3'" allow to perform incidental operations outside said oven 1, without affecting the drying cycle of panels 2.

Said oven 1 is provided with a plurality of racks 6 for storing/drying said painted panels 2, each rack 6 comprising a plurality of fixed laths 7, fixed to the external walls of said oven. In one embodiment, the laths include a plurality of bars of a suitable material, and in other embodiments the laths may be web-shaped. A plurality of overlapped racks 6 forms a column; said columns are placed one on the right and one on the left, so as to be adjacent to the lateral sides of the oven 1.

Figure 3:
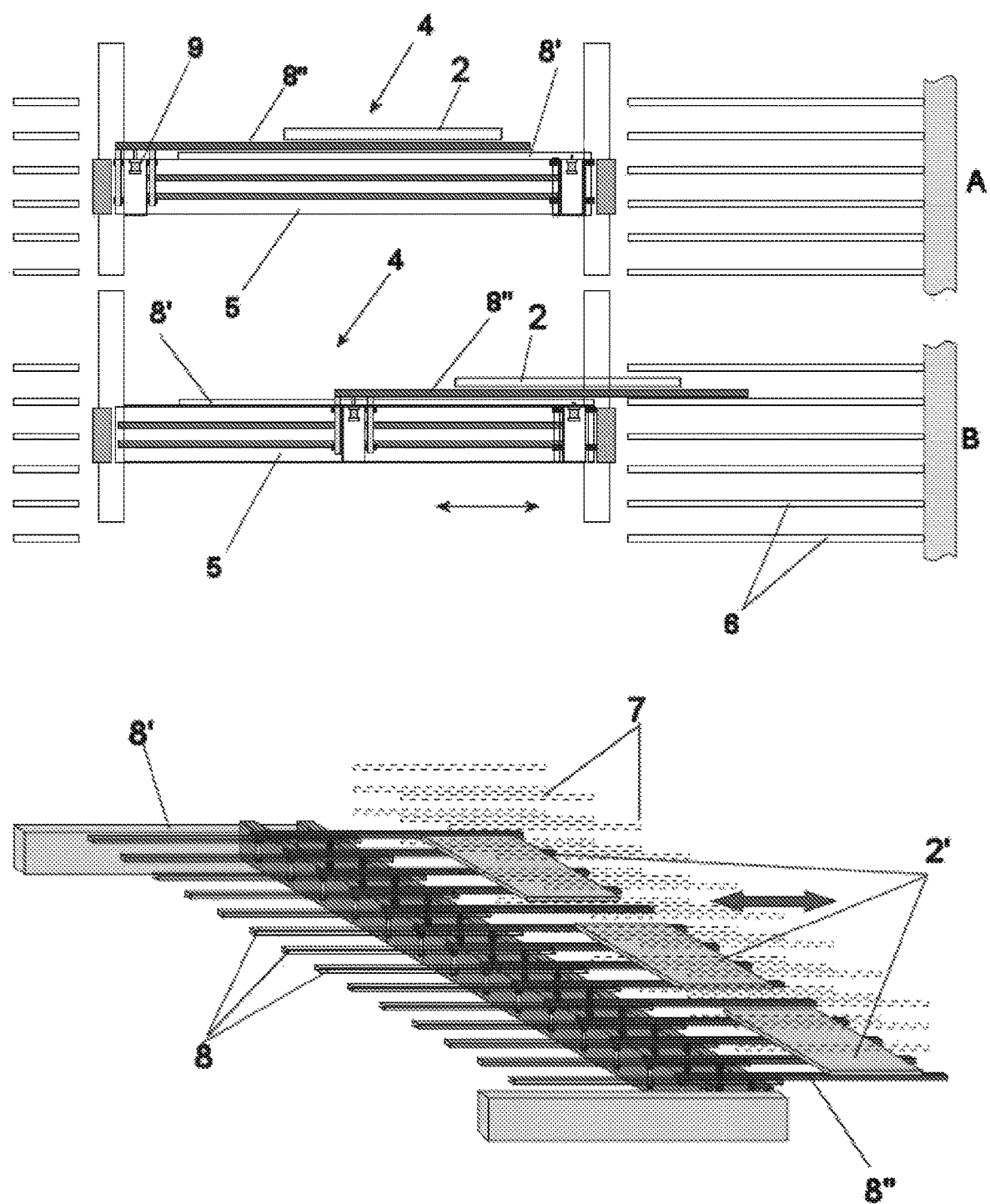
FIG. 3 shows facing multiple forks, adapted for independent movement, and racks provided with laths for supporting panels, in front view and axonometric view.

Moreover, the oven 1 is provided with a stacker crane 4, placed centrally, in its turn provided with two multiple forks 8', 8" (better visible in FIG. 3). In this context is worth mentioning that each multiple fork 8', 8" is formed by a plurality of single forks 8, each of which is actuated by its own actuator. Each single fork 8 can move independently from the further forks 8 making part of a multiple fork 8', 8".

As can be observed also in the following Figures, the painted panels 2 can be provided with different dimensions. In some cases, the width of a panel 2 is such that just one panel 2' can be loaded on a rack 6. In many cases the width of the painted panels is such that two panels 2" can be placed side by side; up to four panels 2'" can be placed side by side. As a consequence, a panel 2" or 2'" lies in an internal (proximal) position with respect to the oven (i.e. contiguous to said stacker crane 4) and a panel 2" or 2''' lies in an external (distal) position with respect to the oven 1 (i.e. more distant to said stacker crane 4).

Said panels 2, 2', 2", 2''' can be provided with different dimensions, different colors, different finish (e.g. glossy/matt), with the aim of preparing a plurality of different customer orders.

It is worth mentioning that panels 2 can be identified in two different ways:

The painted panels 2 are identified through a barcode, a RFID tag or similar;

The painted panels 2 do not carry any identification means, i.e. there are provided no barcodes or RFID tags or similar. In this case, the identification of the single panel is performed through a virtual system based on a software of the oven 1, identifying said panels 2 through their localization in the oven. Obviously, said identification occurs when uploading said panels 2 into the oven 1.

Once the panels 2 have been painted, and optionally partially dried, and subsequently placed inside the oven 1, they have to be withdrawn from said oven in order to prepare a customer order.

Figure 2:
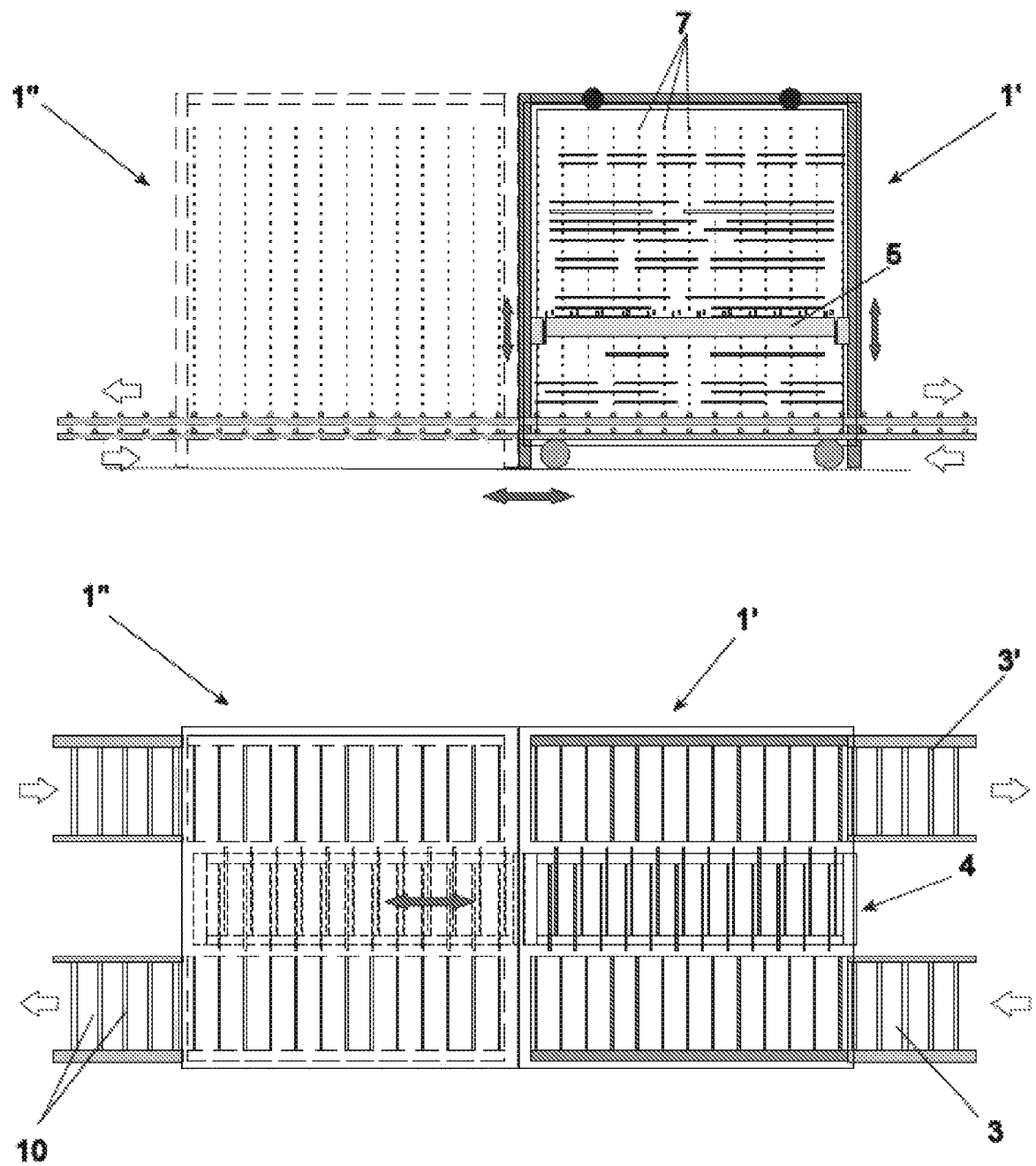
FIG. 2 shows a vertical oven provided with a plurality of units, in side view and top view.

FIG. 2 shows a side view and a top view of the same oven 1.

The side view allows to appreciate that a vertical oven 1 can be made of any number of equal modules 1', 1", placed in series.

As usual, the loading of said oven 1 occurs through an inlet roller conveyor 3; further roller conveyors 3', 3", 3''' can be used for downloading panels or for incidental moving in an interchangeable way.

Said conveyor rollers 3 are provided with a plurality of motorized roller 10, better visible in the top view of FIG. 2.

From said roller conveyors 3, 3', 3", 3''', the multiple forks 8', 8" of the stacker crane withdraw said painted panels 2, raising the plurality of panels 2 and moving it on a platform 5 of said stacker crane 4; then the multiple fork 8', 8" lowers in its resting position. The platform 5 of the stacker crane takes a position in front of a free rack 6 made of laths 7 of the oven (indifferently on the right or on the left), and the multiple fork 8' or 8" (visible in FIG. 3) lays the panel 2 on the laths 7 of a rack 6 by raising said panels 2, translating towards said laths 7 and lowering in order to disengage from said panels. Finally, the multiple fork 8' or 8" goes back to its resting position (over the platform 5 of the stacker crane 4).

FIG. 3 shows a detail in a front view and in an axonometric view of a platform 5 of said stacker crane 4. The platform 5 is provided with two multiple forks 8', 8" moving in opposed directions, of which a first multiple fork, e.g. 8", moves toward the right and a second multiple fork, e.g. 8', moves towards the left.

The platform 5 is used according to the plurality of inlet painted panels, which plurality comprises panels 2 coming from a single painting operation. Therefore, such panels share the same color and the same finish (as all were painted with the same painting product), but not necessarily the same dimensions.

According to the present invention, the withdrawing of panels is performed through a platform 5 comprising said two systems of independent multiple forks 8' and 8". Each single fork 8 is actuated according to the dimensions of said panel, in order to allow the movement of the desired panel only, as will better explained in the following.

FIG. 3 shows, in its front view, said platform 5 and said multiple forks 8', 8", comprising a plurality of single forks 8, which single forks 8 are provided each of a cylinder actuator 9 raising each single fork.

FIG. 3 in its front view shows a sequence of panel depositing: in Figure A, initially the multiple fork 8" is in its position inside platform 5; in their resting position, the two multiple forks 8', 8" are overlapping inside said platform 5.

In Figure B, in a second moment, said multiple fork 8" slides towards the side of the oven 1, to place itself under the laths 7 that compose a rack 6. During this operation, the multiple fork 8' remains resting inside said platform 5.

The axonometric view of FIG. 3 shows the same situation of the front view B, wherein the single forks 8 of the multiple fork 8" are sliding under the painted panels 2' in order to withdraw them. The laths 7 that compose a rack 6 are shown with dotted lines. For withdrawing all the panels 2', all the forks 8 belonging to the multiple fork 8" are used. The single forks belonging to the multiple fork 8' remain in their resting position.

Figure 4:
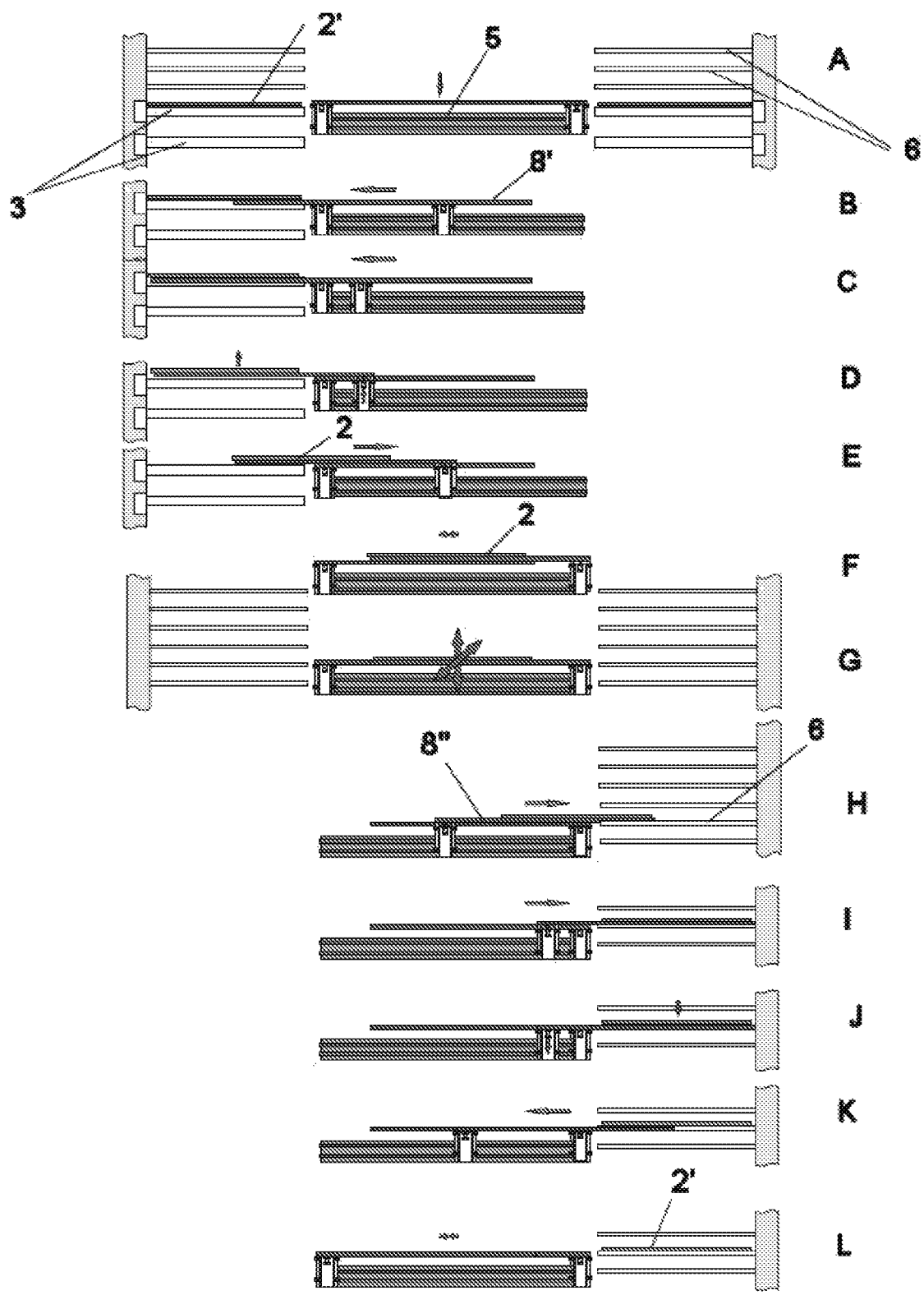
FIG. 4 shows a sequence of withdrawing steps of painted panels from a roller conveyor and deposit on a lath rack, in front view.

FIG. 4 shows a sequence of withdrawing of painted panels 2' on a roller conveyor 3 through the multiple fork 8' of the platform 5, and subsequently their depositing on a rack 6, in a front view. Each letter shows a step of the operation, and must be considered as a frame in a movie.

From top to bottom:

A. Said platform 5 takes a position at the height of the roller conveyor 3, from which the painted panel 2 must be withdrawn;

B. The multiple fork 8' is inserted below the panel 2' supported by the rollers 10 of the roller conveyor 3

C. The multiple fork 8' is completely under the panel 2' supported by the rollers 10 of the roller conveyor 3;

D. The multiple fork 8' is raised by cylinders 9 raising the panel 2' with respect to the plane defined by the rollers 10 of the roller conveyor 3;

E. The multiple fork 8' goes back to its final position corresponding to the stacker crane 4;

F. The multiple fork 8' is lowered;

G. The platform 5 of the stacker crane 4 is raised up to the rack 6 where the panel 2' is to be deposited;

H. The multiple fork 8" is raised and starts to insert said panel 2' into the desired rack 6;

J. The multiple fork 8" completes the insertion of the panel, completing all the side stroke of the multiple fork 8";

K. The multiple fork 8" is lowered with respect to the plane defined by the rack 6; in this way the panel is supported by the laths 7 composing a rack 6;

L. The multiple fork 8" goes back to its resting position towards the platform 5;

M. The multiple fork 8" is in its resting position over the platform 5.

Figure 5:
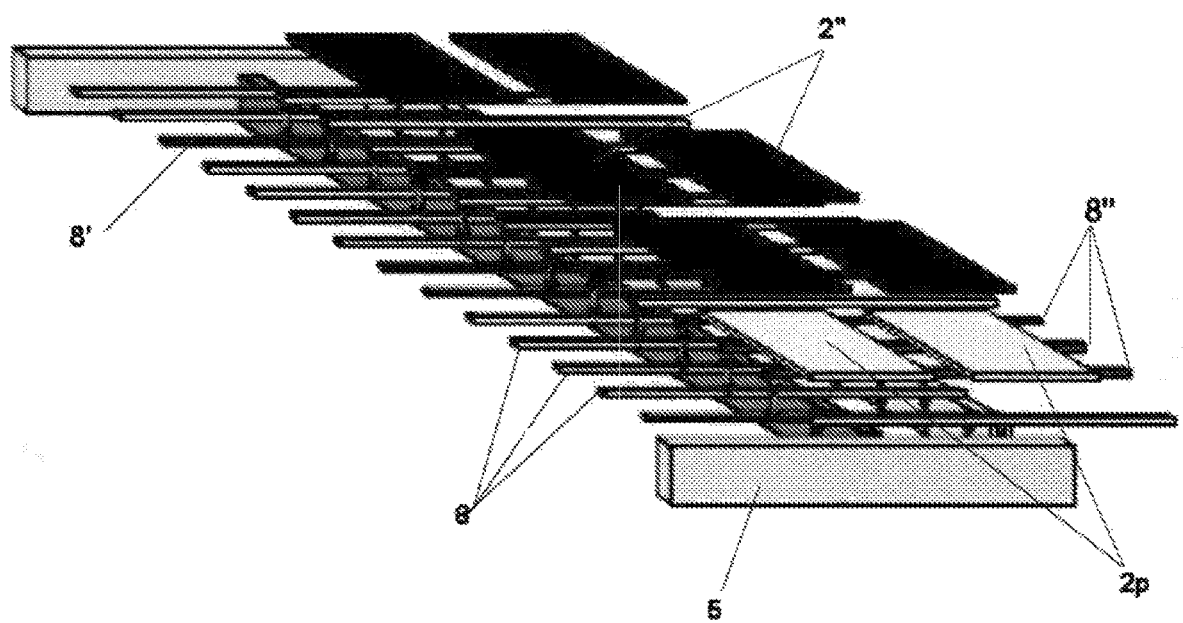
FIG. 5 shows a detail of the partially raised forks in order to withdraw just two painted panels, in axonometric view.

The operation of downloading a panel 2 from a rack 6 to a roller conveyor 3' occur in the same way, but upside down, going from L to A. FIG. 5 shows the withdrawing of two panels 2p that lie side to side on the same rack 6. In this first case, the withdrawing of both panels 2p placed side to side is desired. In this case, the selection is performed raising vertically the single forks 8, part of the multiple fork 8", which are underlying under said panels 2p, while the panels 2" remain at their place on the rack 6, in that the forks 8 underlying panels 2" are not actuated.

Figure 6:
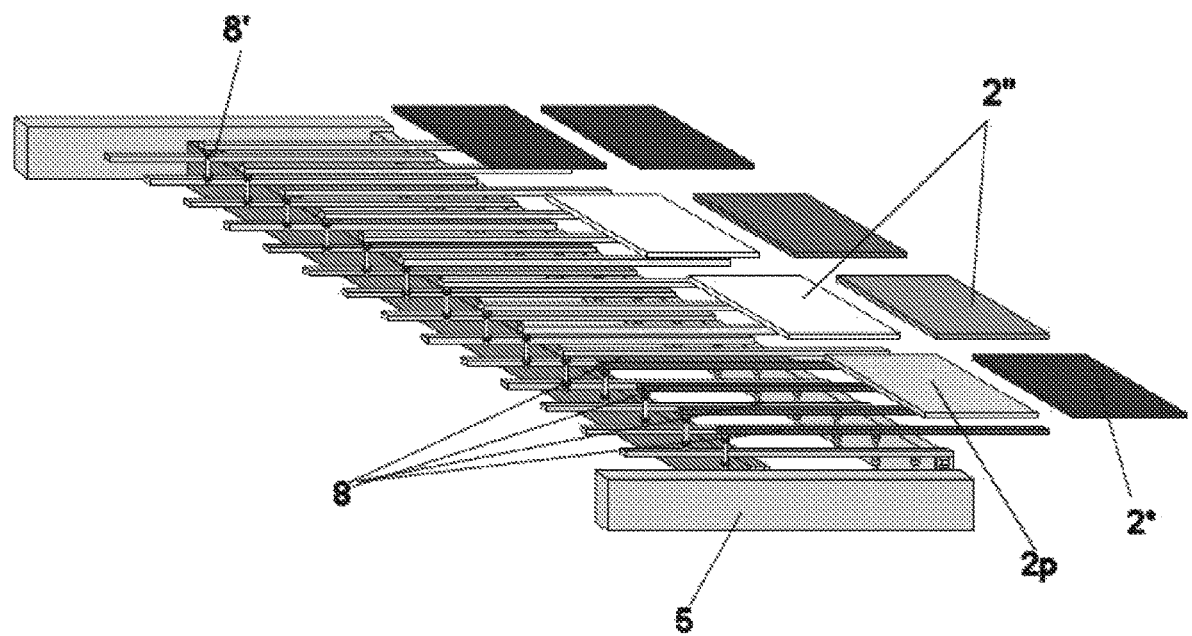
FIG. 6 shows a detail of the partially raised forks in order to withdraw just one painted panel, axonometric view.

FIG. 6 shows the selective withdrawing of one panel 2p only. In this case the side stroke of the single forks 8 which compose the multiple fork 8" underlying the panel 2p is limited to the length needed for the withdrawing of the desired panel 2p only, without reaching its end of stroke, which would lead to the withdrawing of the undesired panel 2*. In order not to complicate the Figure, which would become unreadable, the laths 7 composing the rack 6, supporting all panels 2, are not shown.

The FIG. 7 show a more complex case, wherein the panel 2p which is to be withdrawn lies on the side opposed to the entry side of the multiple forks 8". As an example only, let's say that the panel 2p is on the right side of the oven 1. In this case, as the panel 2p is in an external position of the rack 6, it is necessary to withdraw all the panels 2 and 2p through the multiple forks 8", and move them on the opposed side of the oven, let's say on the left side of the oven 1, so as to bring the desired panel 2p on the internal side of the oven 1 where the platform 5 lies, and successively withdraw the panel 2p in the same way as shown in FIG. 6.

Figure 7A:
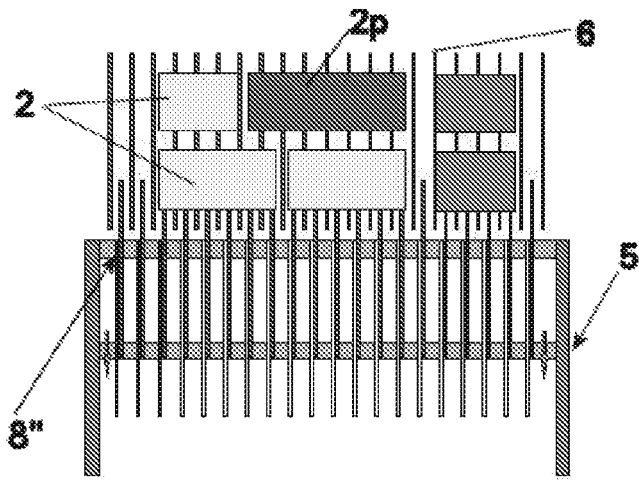
FIG. 7 shows a sequence of withdrawing steps of a panel lying in the external row of the vertical oven, top view.

FIG. 7A shows the panel 2p to be withdrawn supported on a rack 6 on the right side of the oven, to which the platform 5 has no direct access.

Figure 7B:
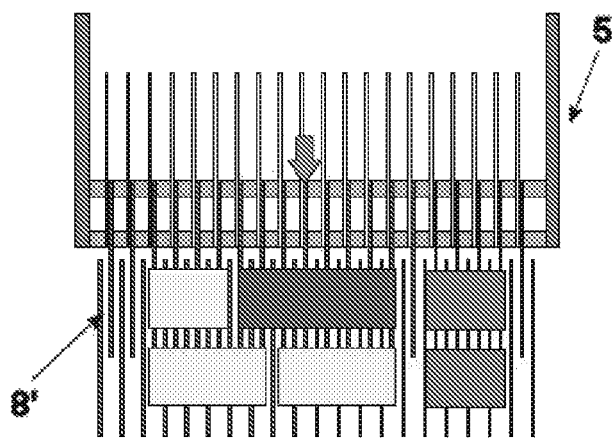

At this point, all the panels 2 placed on the rack 6 are moved in the direction indicated by the arrow in FIG. 7B, towards the opposed side of the oven, so that the platform 5 is in contiguity with the desired panel 2p.

Figure 7C:
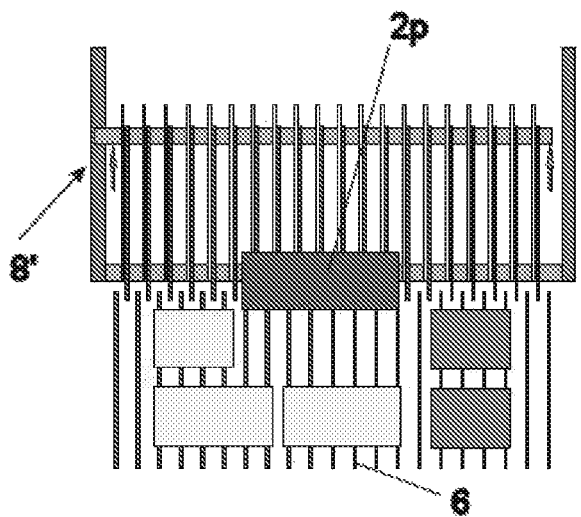

FIG. 7C shows that, once all panels 3 have been brought on the opposed side of the oven, and therefore the platform 5 and the panel 2p are contiguous, the withdrawing of panel 2p occurs as shown in FIG. 6, using only the forks 8 of the multiple fork 8' corresponding to the length of the panel 2p, just for a stroke corresponding to the width of the panel 2p.

The withdrawing of the panels 2 through the multiple forks 8' and 8" is known in the art. For the apparatus according to the present invention there is provided a software suitable for connecting the dimensions of the panel to be withdrawn with the actuation of the single forks 8 dedicated to the withdrawing. This both for the number of single forks 8 which is actuated for each withdrawing (corresponding to the length of the panel 2p), and for the length of their stroke (corresponding to the width of the panel 2p) of the single fork 8 actuated for the specific withdrawing.

Said single forks 8 are actuated through pneumatic actuators (cylinders 9); each single fork 8 is provided with a dedicated pneumatic actuation. In other words, each single fork 8 has its own cylinder 9.

The software of the apparatus can memorize, when uploading the single panel, the dimensions, the finish, the color, the place of the panel 2. When it is requested to withdraw a desired panel, the software, which memorized in which position the desired panel is lying, actuates the actuators moving the forks 8 correspondingly to the panel's dimensions.

The method according to the present invention comprises the following steps:

a. Uploading said painted panels 2 inside said oven 1 withdrawing the panels from the inlet roller conveyor 3 through the multiple forks 8', 8" of the stacker crane, and inserting them in any free rack 6 of the oven;

b. Keeping said panels 2 inside said oven 1 for a time sufficient for their drying or the completion of their drying;

c. Withdrawing said panels 2 through the multiple forks 8', 8" of the stacker crane and depositing them on the outlet roller conveyor 3' for preparing a customer order;

wherein said panels 2 are withdrawn through said stacker crane 4 according to a pull sequence, so as to download single panels 2 independently of their color/finish and the sequence of uploading in order to prepare a customer order.

The vertical oven 1 is provided with a software suitable for:

Memorizing the position of the uploaded panels 2 in terms of place of the rack 6 and position inside a single rack 6;

Actuating the single forks 8 composing the multiple forks 8', 8" of the platform 5 correspondingly to the length and width of the panel/s 2 to be withdrawn.

Figure 8:
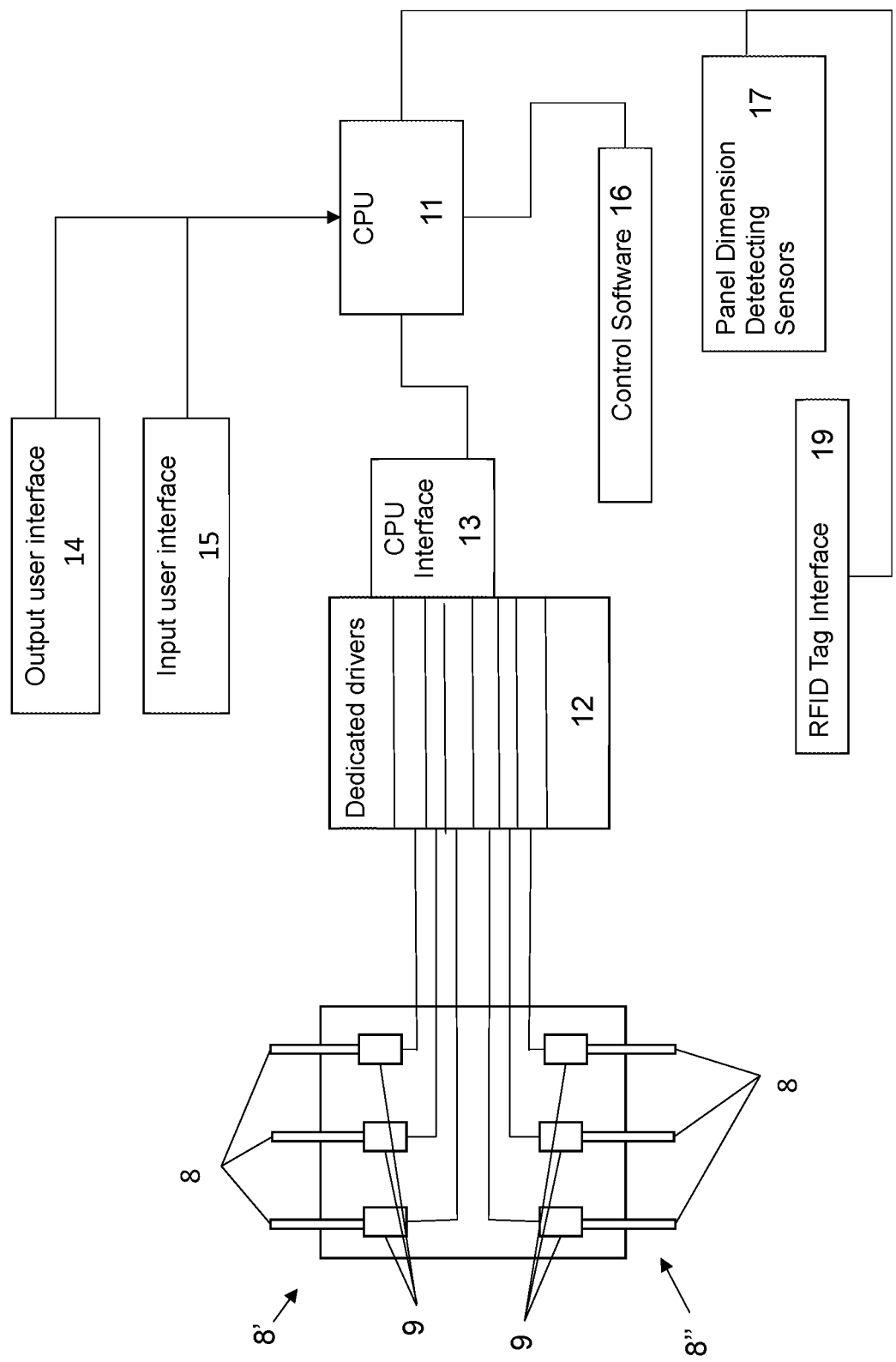
FIG. 8 shows a lock diagram of an embodiment of the control system of the vertical oven.

FIG. 8 shows a block diagram of an embodiment of the control system of the vertical oven according to the present invention. The two multiple forks 8', 8" comprising each single forks 8 are schematically shown. Each fork 8 is associated to its own actuator 9. The actuators 9 are independently controlled by a dedicated driver 12, which communicates with a control unit (CPU) 11 through an interface 13, selectively connecting each driver to said control unit 11. The control unit is a processing unit, e.g. in the generic form of a PLC or a PC, and executes a control software 16 memorized in a memory area. The control unit 11 is further connected to a man-machine interface comprising at least an output interface, from the machine to the human user, indicated with 14, and at least an input interface, from the human user to the machine, indicated with 15. Thanks to these two interfaces, a human user can manually input the identifying data of a panel or a group of panels and the corresponding dimensions needed to control the single forks 8 according to the dimensions of the panel.

The output interface 14 provides a feedback on the data inputted by the user with the input interface 15 and/or shows the user system notifications.

In alternative or in combination to what is provided in the embodiment of the FIG. 8 example, the control unit 11 can be connected to at least a sensor or a detecting system of the features of each panel 2, at least of the dimensions (width and length) of the panel, indicated with 17.

Analogously, in alternative or in combination there can be provided a communication interface 19 for a RFID tag or another kind of tag associated to the panel, wherein the information relating to the kind of panel and/or finish of the panel and/or the dimensions (at least width and length and/or height) are stored.

Thanks to the programmable control system of which FIG. 8 shows a non-limitative embodiment, the vertical oven 1 can perform several functions, and in particular the functions relating to the selective actuation of the single forks 8, which are selected according to the dimensions of each single panel when they are withdrawn by said forks.

Many variant embodiments are possible, and they have to be considered part of the routine choices of the skilled person while designing a project.

The control system of the above-described oven allows also to integrate said oven in a wider and more complex production plant, comprising also other productive units, each intended for a different processing. A particular embodiment can provide a totally automated production line, which entails the human intervention in the step of uploading the panels in a warehouse from which they are automatically withdrawn for a further processing. In this case, the management of the whole plant is assigned to a central control unit, to which the control unit of each machine or processing/conveying line make reference. In this case, the panel associated with a customer order are stored in a centralized warehouse from which said panels are transferred to the production line to one or more processing unit.

The features of the single panels, in particular their dimensions, can be manually inputted by a human user, or through an automated detecting system 17 as described above, just for the control unit of the vertical oven. From here the plant becomes completely automatic, and withdrawing the panels composing a customer order from a pre-set storing unit, allows to univocally access to information relating to panel dimensions, and to transmit these features to one or more of the processing units comprised in the production line, and in particular to the control unit of the oven.

LIST OF REFERENCE NUMBERS 1 vertical oven
2 painted panel
3 roll conveyor
4 stacker crane
5 platform
6 rack
7 laths
8 fork
9 actuator
10 roller (belonging to the conveyor roller)
11 processing unit of the control unit
12 driver dedicated for the single independent actuators for each single fork
13 interface
14 user interface for input
15 user interface for output
16 memory for the control software
17 automated panel dimensions sensor
19 interface for RFID tag or similar

The invention claimed is:

1. A vertical oven for drying and temporarily storing painted panels, comprising:
a plurality of racks made of fixed laths for supporting the panels, the plurality of racks being disposed to form at least two facing columns;
an uploading/downloading system of the panels in and from the vertical oven with an inlet roller conveyor and an outlet roller conveyor;
a stacker crane comprising a first multiple fork and a second multiple fork each comprising a plurality of single forks, wherein the first multiple fork withdraws the panels placed on a first side of the oven and the second multiple fork withdraws the panels placed on an opposite side of the oven,
wherein the racks are configured to receive the panels side by side according to a width of the panels; and
a control unit configured to control an uploading/downloading of the panels and/or the stacker crane, the control unit executing a control software comprising instructions that control the uploading/downloading system of the panels and/or the stacker crane,
wherein each single fork is operatively connected to an independent actuator of a plurality of independent actuators, the independent actuators being separately controlled by the control unit
wherein the control unit comprises instructions for an independent control of the each of the independent actuators, and
wherein the control software further comprises second instructions configuring the control unit to determine:
a number of the single forks to be actuated, corresponding to a length of a panel to be withdrawn;
a length of a stroke of the first multiple fork and the second multiple fork according to the width of the panel to be withdrawn.

2. The vertical oven according to claim 1, wherein the control software comprises the instructions enabling the uploading/downloading system to withdraw two panels placed side by side on one of the racks.

3. The vertical oven according to claim 1, wherein the control software comprises the instructions enabling the uploading/downloading system to withdraw only one panel placed contiguous to the stacker crane from one of the racks, on which at least some of the panels are placed side by side.

4. The vertical oven according to claim 1, wherein the control software comprises the instructions enabling the uploading/downloading system to withdraw a single panel from one of the racks on which at least some of the panels are placed side by side, the single panel being placed on a side of the one of the racks that is opposite to the stacker crane, and wherein all of the panels supported by the one of the racks are firstly moved from the first side of the vertical oven to the opposite side of the vertical oven.

5. The vertical oven according to claim 1, wherein the panels are identified in two alternative ways:
with a barcode or a RFID tag, in combination with a barcode reader or a RFID tag reader connected to the control unit; or
the panels carry no identification device and identification of the panels is performed alternatively or in combination with,
information on panel features provided by a human operator through a man-machine interface connected to the control unit,
information on the panel features acquired by the control unit of the vertical oven a location of the panels in the vertical oven, except when uploading the panels into the vertical oven, or
information on the panel features that is associated to the location of the panels inside the vertical oven,
wherein the control software is interfaced with a managing system of the vertical oven.

6. The vertical oven according to claim 1,
wherein the vertical over is arranged within a production line comprising a panel processing machine, and a managing system of processing orders of the panels,
wherein the managing system comprises an order control unit executing an order control software and generates a database, in which the panels are identified by dimension and position within the vertical oven, the managing system being connected to the control unit of the vertical oven and transmitting information about types and/or features of the panels that is acquired when the panels are uploaded into the vertical oven.

7. The vertical oven according to claim 1, wherein the inlet roller conveyor and the outlet roller conveyor comprises a plurality of inlet roller conveyors and outlet roller conveyors.

8. The vertical oven according to claim 1, further comprising one or more additional vertical ovens arranged in series.

9. The vertical oven according to claim 1, further comprising at least one sensor detecting dimensions of the panels, the at least one sensor being operatively connected to the control unit.

10. A method of withdrawing painted panels having different dimensions and finishes, the painted panels being partially dried and stored in a vertical oven according to claim 1, the method comprising:
uploading the painted panels inside said vertical oven by withdrawing the painted panels from the inlet roller conveyor using the first multiple fork and the second multiple fork of the stacker crane, and inserting the painted panels in any free racks in the vertical oven;

keeping said painted panels inside said vertical oven for a time sufficient for drying or for completing the drying of the painted panels;

withdrawing said painted panels using the first multiple fork and the second multiple fork of the stacker crane and depositing the painted panels on the outlet roller conveyor for preparing a customer order;

providing a software configured for:

memorizing positions of the painted panels uploaded into the vertical according to rack position and panel position on a respective rack; and actuating the single forks according to a length and the width of one or more of the painted panels to be withdrawn, wherein each single fork is actuated independently from other single forks composing the first multiple fork and the second multiple fork.

11. The method according to claim 10, wherein each of the positions of the painted panels is univocally associated with information about features of a respective panel, the features one or more of the length and width of the respective panel and type of paint or coating of the respective panel.

* * * * *